Patented Nov. 20, 1945

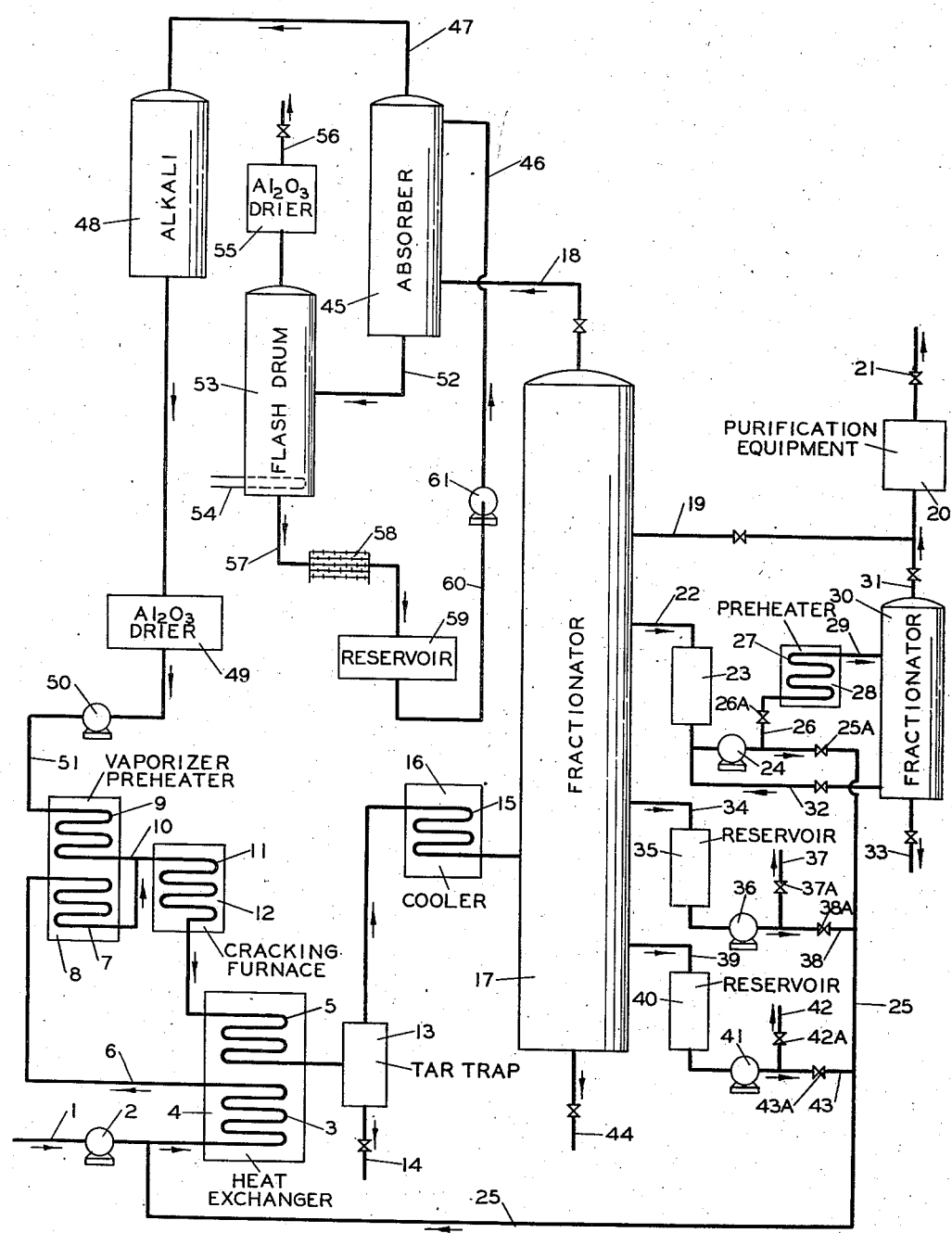

2,389,231

UNITED STATES PATENT OFFICE 2,389,231

PROCESS FOR CONVERTING ORGANIC HALIDES

Donald R. Blumer, Bartlesville, Okla., assignor to Phillips Petroleum Company, a corporation of Delaware Application February 10, 1942, Serial No. 430,288

2 Claims. (Cl. 260—680)

This invention relates to new and useful improvements in processes for dehydrohalogenation of halogenated hydrocarbons for production of unsaturated hydrocarbons or halogenated derivatives thereof and pertains more particularly to the production of aliphatic conjugated diolefins and halogenated derivatives thereof, such as, for example, chlorobutadiene. It is especially applicable to the production of 1,3-butadiene from 2,3-dihalobutane. More specifically, it refers to effecting said dehydrohalogenation reactions in open tubes or vessels without use of added solid catalysts or other dehydrohalogenating agents known to the art but rather thermally under very carefully controlled operating conditions, the only catalytic effect, if any, being caused by the wall surface or reaction or decomposition products formed on the walls of the reaction vessel.

It has been previously shown that such dehydrohalogenation reactions may be effected by passing the vapors of the halogenated materials at elevated temperatures through reaction vessels filled with solid dehydrohalogenation catalysts such as the halides, particularly the chlorides and bromides, of the following elements: aluminum, barium, cobalt, copper, iron (ferrous), lead, and nickel. Other catalysts mentioned are: alumina; borates; phosphates; silicates; silicon alloys such as ferro-silicon, manganese-silicon, or copper-silicon; platinum; non-volatile acids such as phosphoric and boric acids; and materials having large surface areas such as silica gel, bleaching agents, activated carbon, filler materials coated with lustrous carbon, and chamotte. These catalysts may be either used alone or supported on suitable carriers such as pumice, activated charcoal, or like materials.

It has been shown that steam, water vapor, or ammonia are effective in catalyzing dehydrohalogenation reactions in the vapor phase at elevated temperatures either in the presence or absence of solid catalysts such as those listed above. In the case of water vapor or steam, it appears that the halides are hydrolyzed to hydroxy compounds which are then dehydrated to the corresponding unsaturated compounds. Also, it has been shown that such catalyzed reactions may be carried out by passing the vapors of the halogenated compounds through molten metal halides, particularly the chlorides, such as the chlorides of one or more of the following elements: aluminum, potassium, sodium, iron, zinc, bismuth, and other metals. A mixture of aluminum chloride and potassium chloride in equimolecular proportions is especially suitable since it has low melting point and low vapor pressure at the temperature of the process. Also, it has been shown that dehydrohalogenation may be effected by passing the halogenated organic compounds over heated anhydrous alkalies or oxy compounds of metals of metallobasic character such as the following: soda lime, caustic lime, calcium hydroxide, potassium hydroxide, sodium hydroxide, carbonates such as potassium carbonate, lead oxide, magnesia, titanium dioxide, and other titanium oxides. In some cases in which the halogen is loosely bound, dehydrohalogenation may be effected by heating or boiling the halogenated organic material with aqueous or alcoholic alkaline solutions such as those of potassium hydroxide or by treatment with amines or organic bases such as aniline, quinoline, pyridine, or their methyl derivatives. It has also been shown that use of reduced pressure or inert diluents such as nitrogen, carbon dioxide, hydrogen, or the like favor such dehydrohalogenation reactions by reducing polymerization and other secondary reactions of the reaction products.

There are serious disadvantages inherent to the use of the above solid catalysts, such as the cost of the catalytic materials required and the expense of preparation of suitable catalysts, poor heat transfer through porous materials, poisoning of the catalysts by deposition of tar and other decomposition products upon the catalytic surfaces, necessity for regeneration of the catalysts, clogging of the reaction vessels with tar and coke and necessity for cleaning out clogged catalyst beds. With the use of steam or water vapor in carrying out such reactions, the combination of water vapor and hydrogen halide vapors and also aqueous hydrogen halide condensates which form present serious corrosion difficulties which require the use of very expensive corrosion resistant alloys, refractories, or glass for construction purposes and also result in high maintenance costs. When ammonia is used for dehydrohalogenation at elevated temperatures, there is considerable loss of this relatively expensive material because of decomposition to nitrogen and hydrogen. With molten metal halide baths difficulties are encountered because of sublimation of the salts and condensation in cooler parts of the reaction system. When dehydrohalogenation is effected by means of alkalies or oxy compounds of metals of metallobasic character the hydrogen halide liberated is fixed by formation of metal halides from which it is ordinarily very difficult to recover the halogens for reuse in the process except by electrolysis, which requires very cheap electrical power in order to have an economically feasible process. Similary, when ammonia or the organic bases such as aniline, quinoline, pyridine, or their methyl derivatives are used for effecting dehydrohalogenation reactions, recovery of the hydrogen halides therefrom for reuse of both the acid and basic constituents in the process is extremely difficult.

The object of this invention is to eliminate to as great an extent as possible the difficulties enumerated above which are encountered in effecting dehydrohalogenation reactions by known procedures. In addition, it is the purpose of this invention to secure additional advantages inherent in this improved process, which are as follows: By the use of externally heated tubes of small diameter or chambers wherein the distance between the heated walls is small, it is possible to secure much better transfer of heat from the walls to the vapors of the halogenated organic compound for effecting endothermic dehydrohalogenation reactions than is possible when heat transfer has to be effected through a relatively thick bed of porous solid catalyst. By passing the vapors through the heated reaction chamber rapidly enough, it is possible to secure a high degree of dehydrohalogenation and yet keep polymerization, decomposition, and other secondary reactions of the reaction products negligible so that there is very little tendency for tarry or carbonaceous layers to deposit upon the walls of the reaction vessel, which deposits interfere with heat transfer and may even result in plugging of the reaction vessel. With open tubes or reaction chambers such as are used in this process any tarry or carbonaceous layers which deposit upon the walls of the reaction vessels can be readily burned off or, if the vessel should clog completely, it can be cleaned out more readily than is the case if it is filled with solid catalysts which have become coked up.

This invention is applicable to the dehydrogenation of halogenated hydrocarbons generally to produce unsaturated hydrocarbons and halogenated derivatives thereof. More particularly, it may be used for dehydrohalogenating monohalogenated alkanes to olefins, dihalogenated alkanes and/or monohalogenated alkenes to diolefins, trihalogenated alkanes and/or dihalogenated alkenes to monohalogenated diolefins, and similar reactions. It can also be used for dehydrohalogenating dihalogenated alkanes to monohalogenated alkenes and for similar conversions. The process of the invention consists of passing the vaporized halogenated hydrocarbons through a suitable corrosion-resistant reaction tube or chamber, which is heated externally or otherwise to a temperature sufficiently high to cause substantial evolution of hydrogen halide but not high enough to cause serious decomposition, polymerization, or other secondary reactions of the unsaturated reaction products.

Temperatures required for such dehydrohalogenation reactions ordinarily lie within the following ranges: 250–750° C. for halogenated butanes, 250–650° C. for halogenated pentanes, 250–600° C. for halogenated hexanes, and somewhat lower temperatures for the halogenated derivatives of the heptanes and higher hydrocarbons. The total pressure is usually substantially atmospheric but may range from about 0.02 to 2 atmospheres. If the pressure of the material being decomposed is reduced below atmospheric or its partial pressure is reduced by dilution with inert diluents, lower temperature can be used to effect the same conversion that is obtained at atmospheric pressure with less loss of material due to decomposition, polymerization, and other secondary reactions of the initial products formed.

The contact time with the heated reaction space must be carefully controlled to avoid such secondary reactions which result in loss of product. Ordinarily, this contact time is a few tenths of a second or less, for example, not more than about 0.5 second, at temperatures at which the per pass conversion is sufficiently great to be of commercial interest. At lower temperatures, longer contact times may be used; however, the output for a reactor of given size per unit of time will become too small to be commercially practicable if too low temperatures are used. Also, by use of shorter contact time or more rapid flow rates the walls of the reaction vessel are swept freer of carbonaceous or other decomposition products which tend to build up on the walls of the vessel and clog the passages at lower gas velocities. Rapid cooling of the effluent gases and separation of the unsaturated products from the hydrogen halide are effective in preventing back reactions and other secondary reactions which are likely to occur, particularly at higher temperatures.

This invention is best described by reference to the accompanying drawing, wherein the essential operations of the process are illustrated. The liquid organic halide feed stock which is to be dehydrohalogenated is introduced into the reaction system through line 1 into circulating pump 2 by means of which it is forced through coil 3 of the heat interchanger 4. Part of the heat available from the effluent from the dehydrohalogenation step, is utilized in heat interchanger 4 to preheat the feed stock, which then flows through line 6 into the vaporizer coil or chamber 7 of the vaporizer-preheater 8, wherein it is completely vaporized. At point 10 the vaporized organic halides may be mixed with inert diluents, if desirable, which have likewise been preheated by passage through the coil or chamber 9 of the vaporizer-preheater 8, which may preferably be heated by combustion of natural gas or refinery waste gases or in any other suitable way. The mixing of the organic halides with the inert diluents at the point 10 may be effected in a special mixing chamber or merely by depending upon the high velocity of the vapors flowing through the lines to cause sufficient agitation for adequate mixing.

Inert diluents which may be used are nitrogen, carbon dioxide, hydrogen or any other gas which does not react to any appreciable extent with the products of the dehydrohalogenation reaction under the operating conditions of the process. Addition of such inert diluent is not necessary, although it does permit dehydrohalogenation at lower temperatures of the temperature range required for a given organic halide with greater decomposition than would occur with undiluted organic halide and it also tends to reduce polymerization, decomposition, and other secondary reactions of the reaction products since the partial pressure of these constituents is reduced. This is particularly desirable in the case of $C_5$, $C_6$, and heavier halides, in which cases it is often desirable to use sufficient inert diluent that the partial pressure of the organic halide lies within the range, 15–50 mm. Hg. Complications are introduced by using such great quantities of diluent, however, such as difficulty in extraction of reaction products from the diluted effluents and also additional heat and heat transfer requirements for the larger volumes of vapor to be treated. It is best to keep the amount of diluent to the minimum required to prevent tar and coke formation and undesirable secondary reactions and in those cases where it is possible to operate satisfactorily without the use of a diluent, it is desirable to do so. The same effect can be accomplished by the use of reduced pressure for the dehydrohalogenation step; however, production of the required reduced pressure is ordinarily impractical because of the corrosive nature of the effluents, difficulty of recovering the gaseous products and undecomposed halides therefrom, and pumping and refrigeration costs involved.

The mixture of organic halide vapors with the inert diluent or the pure organic halide vapors is then passed through the heated dehydrohalogenation reactor 11 in the cracking furnace 12, wherein heating is accomplished by the combustion of waste natural or by refinery gases or any other suitable means. The reactor 11 may consist of tubes or any other type of vessel wherein the distance between the heated walls or other heated surfaces is sufficiently short to permit good heat transfer to the vapors to be heated therein. This reactor may be constructed of stainless steel, Monel metal, silicon carbide or any other alloy, metal, or refractory material capable of withstanding corrosion by the hydrogen halide and other reaction products generated. General conditions of temperature, contact time, and pressure required for effecting such reactions have been disclosed hereinabove. Special conditions for given halogenated hydrocarbons to give optimum yields of desired products may readily be determined by those skilled in the art. Specific conditions for conversion of 2,3-dichlorobutane principally to 1,3-butadiene are revealed in the example below. However, it must be stressed that application of this process is not limited to this starting material and final product.

The effluents from reactor 11 then pass through the cooling coil 5 of the heat interchanger 4, wherein they are sufficiently cooled so that tar and other heavy polymerization products formed condense and flow into tar trap 13 from which they may be removed as required through line 14. The uncondensed vapors are cooled still further in the cooling coil 15 of cooler 16, whence they flow into fractionator 17, which represents a series of fractionators or fractionators and other extractors or scrubbers suitable for separation of the various constituents or fractions of these constituents from the effluent from the dehydrohalogenation step so that these various materials may be separately treated or recycled to the process in any desired proportions as required.

The treatment of these various constituents of the effluent may be illustrated by a description of the processing of the effluent from the dehydrohalogenation of 2,3-dichlorobutane; however, it must be understood that the same general procedure may be applied to the effluents from the dehydrohalogenation of other organic halides. In the first step, the hydrogen chloride (B. P., −83.1° C.) and inert diluent, if present, are separated by means of fractionation or a scrubbing operation from the higher boiling constituents and flow through line 18 to supplementary equipment for separating the inert diluent from the hydrogen halide. Use of refrigeration is required for separation of the hydrogen halide and inert diluent from the unsaturated $C_4$ hydrocarbons in this fractionation step, particularly if it is conducted at atmospheric pressure, which is desirable to prevent reverse and other undesirable secondary reactions. In many cases, this refrigeration may be secured at low cost by utilizing that produced by any vaporization of propane, butane, or other suitable liquefied hydrocarbons required in any of the refinery processes.

A second fraction boiling in the range, −15 to +5° C., is separated and leaves through line 19. This fraction consists principally of 1,3-butadiene (B. P., −4.5° C.) but may contain traces of 1-butene (B. P., −6.3° C.), 2-butene (B. P., +0.9 to +3.6° C.), isobutene (B. P., −7.1° C.), n-butane (B. P., −0.5° C.), and isobutane (B. P., −11.8° C.). This fraction passes through lines 19 and 31 into the purification equipment 20, wherein the 1,3-butadiene is separated in pure form from the impurities by means of suitable solvent extraction or chemical purification processes, and the mixture of paraffins and olefins recovered is recycled back to the refinery for further processing or is utilized in any other way which may be desirable. The purified 1,3-butadiene passes through line 21 to storage.

A third fraction boiling in the range, 5 to 35° C., is separated in fractionator 17 and leaves through line 22, passing into the storage reservoir 23. This fraction consists principally of 1,2-butadiene (B. P., 10.3° C.) and may contain small amounts of 1-butyne, (B. P., 8.8° C.), 2-butyne (B. P., 27.2° C.), and possibly traces of vinylacetylene (B. P., 5.1° C.), and biacetylene (B. P., 9.8° C.). This fraction may be recycled by means of pump 24 back to the dehydrohalogenation step in any desired proportions through valve 25A and line 25, valve 26A being closed. By recycling this material, it may be used to repress the equilibrium reactions wherein these products are formed or these products may be partially isomerized to the more desirable 1,3-butadiene. However, this fraction is preferably treated separately to isomerize the unsaturated hydrocarbons contained therein as completely as possible to 1,3-butadiene since by recycling the material back to the dehydrohalogenation step, part of it is wasted in decomposition, polymerization, and other secondary reactions. In isomerizing these unsaturated hydrocarbons separately, they are forced by means of pump 24 through line 26, valve 25A being closed, into the preheater and isomerization reaction chamber 27 which is heated in furnace 28, which may be gas fired or otherwise heated. The effluent from the isomerization reaction chamber 27 passes through line 29 into fractionator 30, wherein the 1,3-butadiene formed is separated from the higher boiling constituents and passes off through line 31, into the purification equipment 20, where the 1,3-butadiene is separated from contaminants, as was hereinabove described, and passes through line 21 to storage. The contaminants are recycled back to the refinery for further processing or are utilized in any other way which may be desirable. The unsaturated hydrocarbons boiling in the range, 5 to 35° C., are separated in fractionator 30 and pass through line 32 to pump 24, which recycles them through the isomerization step. Any polymers or heavier hydrocarbons formed in the process are removed from fractionator 30 through line 33, depolymerized and recycled to the isomerization step or otherwise utilized as may be desirable.

The isomerization of isomers of 1,3-butadiene to 1,3-butadiene may be effected catalytically by means of processes which are known to the art. For example, Y. M. Slobodin, J. Gen. Chem. (U. S. S. R.), 5, 48–52 (1935); ibid., 7, 2376–80 (1937); C. A. 29, 4732 (1935); ibid., 32, 2081 (1938), found that if these isomers of 1,3-butadiene are passed at a temperature in the range, 205 to 330° C., preferably at 275° C., over Floridin, a special grade of fuller's earth obtained from the Floridin Company, which has been previously activated at 325° C., they are isomerized to form 1,3-butadiene with appreciable conversion per pass and very little dimerization or polymerization. Also, I. G. Farbenindustrie A.-G., British Patent 507,847 (1939); C. A., 34, 454 (1940), discloses the production of 1,3-butadiene by heating dimethyl- or ethylacetylene with basic oxides or hydroxides or alkali salts having an alkaline reaction, e. g., alkali and alkaline-earth oxides and hydroxides, alumina, bauxite, zinc oxide, and alkali carbonates, phosphates and silicates, or mixtures thereof. The walls of the reaction chamber may be coated with alkalies or alkaline earths. Diluents are preferably present. Among examples, ethylacetylene is led at 460° C. and 35 mm. mercury pressure through magnesium oxide. Since 1,2-butadiene is less stable than 1,3-butadiene and tends to isomerize to the latter form under the conditions cited by Slobodin, it is apparent that the catalysts and operating conditions cited in the above patent would accomplish the same result. Under the above reaction conditions, traces of vinylacetylene and biacetylene which may be present are polymerized and removed from the reaction system.

A fourth fraction boiling in the range, 35 to 95° C., is separated in fractionator 17 and leaves through line 34, passing into the storage reservoir 35. This fraction consists principally of 3-chloro-1-butene (B. P., 64° C.), although small amounts of other isomers such as, for example, 1-chloro-2-butene (B. P., 84° C.) may be present. This fraction may be recycled by means of pump 36 back to the dehydrohalogenation step in any desired proportions through line 38 and line 25, valve 37A being closed, to be dehydrohalogenated further to produce 1,3-butadiene or its isomers. If desired, this fraction may be passed by means of pump 36 through line 37, valve 38A being closed, into separate dehydrohalogenation equipment similar to that described herein under other operating conditions which are more favorable for dehydrohalogenation of these particular compounds. Likewise, this fraction may be taken off through line 37 and utilized for the production of other more valuable special products.

A fifth fraction boiling in the range, 95 to 165° C., is separated in fractionator 17 and leaves through line 39, passing into the storage reservoir 40. This fraction consists principally of 2,3-dichlorobutane (B. P., 114-120° C.), but may contain small amounts of other dichlorobutane isomers having boiling points lying within the range, 102 to 163° C. This fraction may be recycled by means of pump 41 back to the dehydrohalogenation step in any desired proportions through line 43 and line 25, valve 42A being closed, to be dehydrohalogenated further to produce, 1,3-butadiene or its isomers. If desired, this fraction may be passed by means of pump 41 through line 42, valve 43A being closed, to additional fractionating equipment in which this fraction may be broken up into closer boiling cuts, the 2,3-dichlorobutane being recycled back to the dehydrohalogenation equipment and the other dichlorobutane isomers being dehydrohalogenated separately in equipment similar to that previously described but maintained at other operating conditions more favorable for their dehydrohalogenation. Likewise, some of these dichlorobutane isomers may be recovered and utilized for the production of other more valuable special products.

A sixth fraction boiling above 165° C. is separated in fractionator 17 and leaves through line 44. This bottom fraction which consists of higher boiling polymers and higher chlorides may be further processed as desired for recovery of any valuable by-products contained therein.

In the event that inert diluent is used in the dehydrohalogenation step, the hydrogen halide is separated from the mixture leaving fractionator 17 through line 18 by suitable means, the inert diluent recovered being recycled back to the dehydrohalogenation step. The hydrogen halide separated from the inert diluent or recovered directly from fractionator 17 in the absence of inert diluent is used either directly or after regeneration of free halogen therefrom to halogenate organic compounds in order to produce the organic halides required for treatment in the dehydrohalogenation process. In either case, the hydrogen halide recovered is treated for removal of organic halide or hydrocarbon vapors contained therein by means of adsorption on charcoal or other suitable adsorbent, absorption in heavy oil or other suitable scrubbing solvent having very low vapor pressure, burning out and dehydration step, or other suitable means and the residue used for halogenation as indicated above. Free halogen may be regenerated from this hydrogen halide by means of the Deacon, electrolytic or other suitable processes for reuse in the process to carry out the required halogenation step.

The separation of the hydrogen halide from the inert diluent is effected by scrubbing the gas mixture with constant-boiling aqueous hydrogen halide solution in absorber 45, which is constructed of suitable corrosion-resistant materials, into which the gas mixture is introduced through line 18, passing upward through suitable packing wet with the aqueous hydrogen halide solution which is introduced from line 46 into the top of absorber 45, in which it flows downward countercurrent to the gas flow. The inert gas substantially freed of hydrogen halide flows from the absorber through line 47 to a scrubber 48 containing soda lime, lime, or other alkaline material for removal of the remaining small amounts of hydrogen halide present. This step is unnecessary provided that the lines and other equipment through which the inert gas must flow back to the dehydrohalogenation step are constructed of materials which will resist corrosion by the small amount of hydrogen halide contained therein. The inert gas then passes through drier 49, containing anhydrous alumina or other suitable desiccant, which serves to dry the gas and reduce corrosion difficulties due to moisture, particularly if the small amount of hydrogen halide present is not first removed in the alkali scrubber 48. The dry gas is then drawn into the circulating pump 50, whence it is pumped through line 51 and preheater coil 9 in the vaporizer-preheater 8. The heated inert gas is then mixed with the vapors of the organic halides at the point 10, from which the vapors flow through the dehydrohalogenation reactor 11 in the cracking furnace 12 and on around through the cycle.

The aqueous hydrogen halide solution which has become more concentrated in hydrogen halide by absorption of the gas in absorber 45 flows out of the absorber through line 52 into the flash drum 53, wherein it is heated by means of the heating coil 54 to regenerate the constant-boiling aqueous hydrogen halide solution and drive off the absorbed hydrogen halide through the drier 55, containing anhydrous alumina or other suitable desiccant for drying the hydrogen halide before returning it through line 56 for reuse in the process for direct halogenation reactions or for regeneration of free halogen by the Deacon, electrolytic, or other suitable processes. This drying step is not absolutely necessary but eliminates necessity for special corrosion-resistant materials in line 56 and in much of the equipment beyond this point. As was previously indicated, it is desirable to treat the dried hydrogen halide gas for removal of organic halides or hydrocarbons before sending it on to the halogen regeneration step.

The constant-boiling aqueous hydrogen halide solution regenerated in the flash drum 53 leaves through line 57, passing through cooler 58 into reservoir 59, whence it flows through line 60 into circulating pump 61, which returns it through line 46 to the absorber 45.

The operation of this scrubbing process for removal of the hydrogen halide from the inert gas may be illustrated by the use of constant-boiling aqueous hydrogen chloride as the scrubbing agent for removal of hydrogen chloride from such a gas mixture. Such a solution has a concentration of 10.5 molar per cent or 19.2 weight per cent hydrogen chloride and a boiling point of 109.7° C. at one atmosphere absolute pressure. The concentration of the hydrogen chloride solution may be increased to about 42 weight per cent hydrogen chloride at a temperature of about 23° C. and partial pressure of hydrogen chloride of one atmosphere or somewhat higher than this if absorption is carried out at lower temperatures, for which refrigeration is ordinarily required. However, the maximum concentration attainable is also a function of the partial pressure of the hydrogen chloride in the gas mixture being scrubbed so that for partial pressures below atmospheric, the maximum concentration attainable will be less than the maximum value cited above for scrubbing operations carried out at ordinary temperatures and a total pressure of one atmosphere for the pure hydrogen chloride. The maximum concentration of acid that one may expect to attain may be determined from the partial pressure of hydrogen chloride in the gas mixture to be scrubbed and data for the partial vapor pressure of hydrogen chloride vapor over the aqueous solution as a function of its concentration and the temperature of the scrubbing operation. These data are available in tables such as the one in the "International Critical Tables," McGraw-Hill Book Company, Inc., New York (1928), vol. III, page 301. Upon reboiling the concentrated acid in the flash drum 53, hydrogen chloride which is practically anhydrous is evolved and the constant boiling hydrogen chloride solution recovered. Ordinarily, this recovered solution will have a concentration of 19 to 22 weight per cent hydrogen chloride, depending upon how completely the absorbed hydrogen chloride is recovered from the solution. The hydrogen chloride may be recovered from the concentrated solution by means of reduced pressure with or without the application of heat or by passing gas through the solution if it is found advantageous to do so.

Similarly, other available data regarding the boiling point and composition of constant-boiling aqueous hydrogen halide solutions and partial vapor pressures of hydrogen halide over aqueous hydrogen halide solutions as a function of their concentrations and temperature may be utilized to determine the operating conditions required for separation of other hydrogen halides from the inert gas diluent and recovery of pure hydrogen halides for reuse in the process.

The equipment indicated by the numbers 45 through 49 and 52 through 61, as well as the end of line 18 which leads into absorber 45, requires special corrosion-resistant construction to withstand attack by the aqueous hydrogen halide solutions. This equipment may be constructed of stoneware; refractories such as glazed fused alumina, fused silica, silicon carbide, or the like; carbon or graphite; glass or glass-lined or coated metal parts; metal parts lined or plated with tantalum or precious metals such as platinum; or any other suitable material which will resist corrosion by such acids. In the case of hydrofluoric acid solutions, glass, fused silica, or refractories containing silica which will be seriously attacked by the hydrofluoric acid must not be used for the construction of such equipment.

The following example will serve to illustrate further the nature of this invention, which, however, is not confined to the processing of this particular organic dihalide to produce a diolefin.

EXAMPLE

Pure 2,3-dichlorobutane was vaporized and the vapors passed at atmospheric pressure through a small-bore tube constructed of 18–8 stainless steel (steel containing approximately 18% chromium and 8% nickel, such alloys being sold under such trade names as Stainless N, Rezistal KA2, Sterling Nirosta, Duraloy 18–8, etc.), the tube being heated to a temperature of 600° C. and carefully controlled at this value. The vapors were passed through the tube at such a rate that the contact time in the heated zone was 0.22 second. The effluent gases were quickly cooled and the composition of the effluent determined by fractionation and other analytical methods. The products isolated from a run made under these experimental conditions and yield data obtained are summarized in the table, wherein the products are listed in the first column; the number of moles of each individual product obtained from one-hundred moles of initial 2,3-dichlorobutane charge stock are listed in the second column; the per pass conversion data, expressed in per cent of theoretical and based on the initial 2,3-dichlorobutane charge stock, are listed in the third column; and the per pass ultimate conversion data expressed in per cent of theoretical and based upon the 2,3-dichlorobutane completely destroyed in the reaction are listed in the fourth column.

TABLE

Dehydrohalogenation data for 2,3-dichlorobutane

| Products | Number of moles from 100 moles initial | Per pass conversion percent of theoretical (based on initial $C_4H_8Cl_2$) | Per pass ultimate conversion percent of theoretical (based on $C_4H_8Cl_2$ destroyed) |
|---|---|---|---|
| $CH_4$ | 2.44 | 0.61 | 1.57 |
| $C_2H_6$ | 0.09 | 0.045 | 0.12 |
| $C_3H_8$ | 0.18 | 0.135 | 0.35 |
| $C_4H_6$-1,3 | 33.39 | 33.39 | 85.84 |
| $C_4H_6$-1,2 | 3.80 | 3.80 | 9.77 |
| Tar (as $C_4$) | 0.90 | 0.90 | 2.31 |
| $C_4H_7Cl$ | 23.62 | 23.62 | |
| $C_4H_8Cl_2$ | 37.47 | 37.47 | |
| HCl | 101.38 | 50.69 | 100.00 |

From the above data, it can be seen that the per pass theoretical conversion of the 2,3-dichlorobutane to 1,3-butadiene and 1,2-butadiene amounts to 33.4 and 3.8 per cent, respectively; to lower molecular weight hydrocarbons and tar amounts to a total of 1.7 per cent; and to recoverable and reusable 3-chloro-1-butene and 2,3-dichlorobutane amounts to a total of 61.1 per cent. Also, considering that the 3-chloro-1-butene and 2,3-dichlorobutane can be recovered and reused in the process to produce butadiene, it is evident that the per pass theoretical ultimate conversion to 1,3-butadiene and 1,2-butadiene based upon the 2,3-dichlorobutane which is completely destroyed or not reusable in the process, amounts to 85.8 and 9.8 per cent, respectively, and to lower molecular weight hydrocarbons and tars amounts to a total of 4.4 per cent. Considering that the 1,2-butadiene can be almost completely isomerized to 1,3-butadiene by the procedure described above, it is evident that ultimate conversions of 2,3-dichlorobutane to 1,3-butadiene approaching 95.6 per cent of theoretical can be obtained by means of the dehydrohalogenation process described above.

It must be stressed that the application of this invention is not limited to the dehydrohalogenation of 2,3-dichlorobutane to butadiene as cited in the above example. For example, the invention may be used to produce the following dehydrohalogenation products: olefins from monohalogenated alkanes containing two or more carbon atoms per molecule; diolefins, alkyl acetylenes, or monohalogenated mono-olefins from dihalogenated alkanes containing three or more carbon atoms per molecule, whereas four or more carbon atoms per molecule are required for conjugated diolefins; triolefins and olefinic acetylenes from trihalogenated alkanes containing four or more carbon atoms per molecule; monohalogenated diolefins, monohalogenated acetylenes, dihalogenated mono-olefins from trihalogenated alkanes containing three or more carbon atoms per molecule, while four or more carbon atoms per molecule are required for production of monohalogenated conjugated diolefins, etc. Similarly, halogenated alkenes, diolefins, acetylenes, cyclic, aromatic, naphthenic, various substituted derivatives of these compounds and other organic halides may be dehydrohalogenated by means of this invention to produce additional unsaturation in the materials treated. Also, the process of this invention may be applied to the production of olefinic acetylenes, such as, for example, vinylacetylene, from the corresponding trihalogenated alkanes and/or dihalogenated alkenes, monohalogenated alkynes, or monohalogenated diolefins; to the production of di-alkynes from suitable tetrahalogenated alkanes, trihalogenated mono-olefins, or dihalogenated diolefins or alkynes containing four or more carbon atoms per molecule; and to the production of diolefinic alkynes from corresponding halogenated derivatives having five or more carbon atoms per molecule. The invention should not be restricted otherwise than as specified in the appended claims.

By "open," as used herein, is meant "unpacked."

I claim:

1. A process for the production of 1,3-butadiene from 2,3-dichlorobutane which comprises passing 2,3-dichlorobutane in vaporized form through an unpacked reaction tube at a temperature within the range of approximately 250° to approximately 750° C. and a pressure of from approximately 0.02 to approximately 2 atmospheres, segregating from the effluent a 1,3-butadiene fraction, a fraction containing incompletely dehydrochlorinated products and a fraction comprising 1,2-butadiene and alkylacetylenes having four carbon atoms in the molecule, subjecting said fraction containing 1,2-butadiene and alkylacetylenes to isomerization in the presence of an activated fuller's earth to convert a substantial portion of the constituents thereof to 1,3-butadiene, and recycling the fraction containing incompletely dehydrochlorinated products together with fresh 2,3-dichlorobutane to the unpacked reaction tube.

2. A process for the production of 1,3-butadiene from 2,3-dichlorobutane which comprises passing 2,3-dichlorobutane in vaporized form through an unpacked reaction tube at approximately atmospheric pressure and at a temperature of approximately 600° C., segregating from the effluent a 1,3-butadiene fraction, a fraction comprising a substantial proportion of 1,2-butadiene, and a fraction containing incompletely dehydrochlorinated products, subjecting said 1,2-butadiene fraction to isomerization in the presence of an activated fuller's earth to convert the 1,2-butadiene to 1,3-butadiene, and recycling the fraction containing incompletely dehydrochlorinated products together with fresh 2,3-dichlorobutane to the unpacked reaction tube.

DONALD R. BLUMER.